(12) United States Patent
Blanksteen

(10) Patent No.: US 12,118,995 B1
(45) Date of Patent: *Oct. 15, 2024

(54) IDENTIFYING A LOCATION OF A VOICE-INPUT DEVICE

(71) Applicant: Amazon Technologies, Inc., Seattle, WA (US)

(72) Inventor: Scott Ian Blanksteen, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 120 days.

This patent is subject to a terminal disclaimer.

(21) Appl. No.: 17/935,486

(22) Filed: Sep. 26, 2022

Related U.S. Application Data

(63) Continuation of application No. 16/882,192, filed on May 22, 2020, now Pat. No. 11,455,994, which is a continuation of application No. 15/925,615, filed on Mar. 19, 2018, now Pat. No. 10,665,235, which is a continuation of application No. 13/624,592, filed on Sep. 21, 2012, now Pat. No. 9,922,646.

(51) Int. Cl.
*G10L 15/22* (2006.01)
*G06F 3/16* (2006.01)
*H04R 29/00* (2006.01)
*H04S 7/00* (2006.01)

(52) U.S. Cl.
CPC ............... *G10L 15/22* (2013.01); *G06F 3/165* (2013.01); *G06F 3/167* (2013.01); *H04R 29/00* (2013.01); *H04S 7/302* (2013.01); *G10L 2015/223* (2013.01); *G10L 2015/226* (2013.01); *H04R 2227/005* (2013.01); *H04S 7/305* (2013.01)

(58) Field of Classification Search
CPC ............... G10L 15/22; G10L 2015/223; G10L 2015/226; G06F 3/165; G06F 3/167; H04R 29/00; H04R 2227/005; H04S 7/302; H04S 7/305
See application file for complete search history.

(56) References Cited

U.S. PATENT DOCUMENTS

| | | | |
|---|---|---|---|
| 7,050,971 | B1 | 5/2006 | Kaufholz |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 7,957,542 | B2 | 6/2011 | Sarrukh et al. |

(Continued)

FOREIGN PATENT DOCUMENTS

| | | |
|---|---|---|
| WO | WO2011088053 | 7/2011 |

OTHER PUBLICATIONS

Krishna et al., "Zigbee Based Voice Control System for Smart Home," IJCTA, vol. 3(1), Jan.-Feb. 2012, pp. 163-168.

(Continued)

*Primary Examiner* — Angelica M McKinney
(74) *Attorney, Agent, or Firm* — Lee & Hayes, P.C.

(57) ABSTRACT

Techniques for identifying a location of a voice-controlled device within an environment. After identifying a location of the device, the device may receive a voice command from a user within the environment and may determine a response to the command based in part on the location, may determine how to output a response based in part on the location or may determine how to interact with the user based in part on the location.

20 Claims, 5 Drawing Sheets

(56) References Cited

U.S. PATENT DOCUMENTS

| | | | |
|---|---|---|---|
| 8,174,561 B2* | 5/2012 | Andersson | H04N 1/00307 |
| | | | 348/231.2 |
| 8,340,975 B1 | 12/2012 | Rosenberger | |
| 8,666,750 B2 | 3/2014 | Buck et al. | |
| 8,744,995 B1 | 6/2014 | Hewinson | |
| 8,930,005 B2 | 1/2015 | Reimann | |
| 9,098,467 B1 | 8/2015 | Blanksteen et al. | |
| 9,922,646 B1* | 3/2018 | Blanksteen | G06F 3/167 |
| 10,665,235 B1* | 5/2020 | Blanksteen | G06F 3/167 |
| 10,803,859 B1 | 10/2020 | Williams et al. | |
| 11,270,690 B2 | 3/2022 | Tang | |
| 11,455,994 B1* | 9/2022 | Blanksteen | H04R 29/00 |
| 2001/0041980 A1 | 11/2001 | Howard et al. | |
| 2003/0138118 A1 | 7/2003 | Stahl | |
| 2005/0094610 A1 | 5/2005 | de Clerq et al. | |
| 2005/0129252 A1 | 6/2005 | Heintzman et al. | |
| 2007/0112942 A1 | 5/2007 | Moquin et al. | |
| 2008/0260180 A1 | 10/2008 | Goldstein et al. | |
| 2008/0262849 A1* | 10/2008 | Buck | G10L 15/28 |
| | | | 704/E11.001 |
| 2009/0138805 A1 | 5/2009 | Hildreth | |
| 2009/0290718 A1* | 11/2009 | Kahn | H03G 3/32 |
| | | | 381/56 |
| 2012/0020189 A1 | 1/2012 | Agevik et al. | |
| 2012/0035931 A1 | 2/2012 | LeBeau et al. | |
| 2012/0044786 A1 | 2/2012 | Booij et al. | |
| 2012/0050570 A1 | 3/2012 | Jasinski et al. | |
| 2012/0078397 A1 | 3/2012 | Lee et al. | |
| 2012/0115501 A1 | 5/2012 | Zheng | |
| 2012/0214507 A1 | 8/2012 | Vartanian et al. | |
| 2012/0223885 A1 | 9/2012 | Perez | |
| 2012/0224707 A1 | 9/2012 | Kim et al. | |
| 2012/0263020 A1 | 10/2012 | Taylor et al. | |
| 2013/0041648 A1 | 2/2013 | Osman | |
| 2013/0202128 A1 | 8/2013 | Jain et al. | |
| 2013/0315038 A1 | 11/2013 | Ferren et al. | |
| 2013/0329921 A1 | 12/2013 | Salsman | |
| 2014/0039888 A1 | 2/2014 | Taubman et al. | |
| 2014/0046464 A1 | 2/2014 | Reimann | |
| 2014/0122071 A1 | 5/2014 | Sierawski et al. | |
| 2017/0083285 A1 | 3/2017 | Meyers et al. | |
| 2018/0012593 A1 | 1/2018 | Prasad et al. | |

OTHER PUBLICATIONS

Office Action for U.S. Appl. No. 13/624,592, mailed on Oct. 10, 2014, Scott I. Blanksteen, "Identifying a Location of a Voice-Input Device," 24 pages.

Office action for U.S. Appl. No. 13/624,592, mailed on Mar. 11, 2016, Blanksteen, "Identifying a Location of a Voice-Input Device," 22 pages.

Office Action for US Patent Application 16/882, 192, mailed on Mar. 11, 2022, Blanksteen, "Identifying a Location of a Voice-Input Device", 5 pages.

Office Action for U.S. Appl. No. 13/624,592, mailed on Mar. 30, 2017, Scott I. Blanksteen, "Identifying a Location of a Voice-Input Device," 31 pages.

Final Office Action for U.S. Appl. No. 13/624,592, mailed on Apr. 1, 2015, Scott I. Blanksteen, "Identifying a Location of a Voice-Input Device," 24 pages.

Office action for U.S. Appl. No. 13/624,592, mailed on Aug. 26, 2015, Blanksteen, "Identifying a Location of a Voice-Input Device," 25 pages.

Office Action for U.S. Appl. No. 15/925,615, mailed on Aug. 8, 2019, Blanksteen, "Identifying a Location of a Voice-Input Device", 8 pages.

Pinhanez, "The Everywhere Displays Projector: A Device to Create Ubiquitous Graphical Interfaces," IBM Thomas Watson Research Center, Ubicomp 2001, 18 pages.

* cited by examiner

IDENTIFYING A LOCATION OF A VOICE-INPUT DEVICE

RELATED APPLICATION

This application is a continuation of and claims priority to U.S. patent application Ser. No. 16/882,192, filed on May 22, 2020, which claims priority to U.S. patent application Ser. No. 15/925,615 (now U.S. Pat. No. 10,665,235), filed on Mar. 19, 2018, which claims priority to U.S. patent application Ser. No. 13/624,592 (now U.S. Pat. No. 9,922,646), filed on Sep. 21, 2012, each of which is fully incorporated by reference herein.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
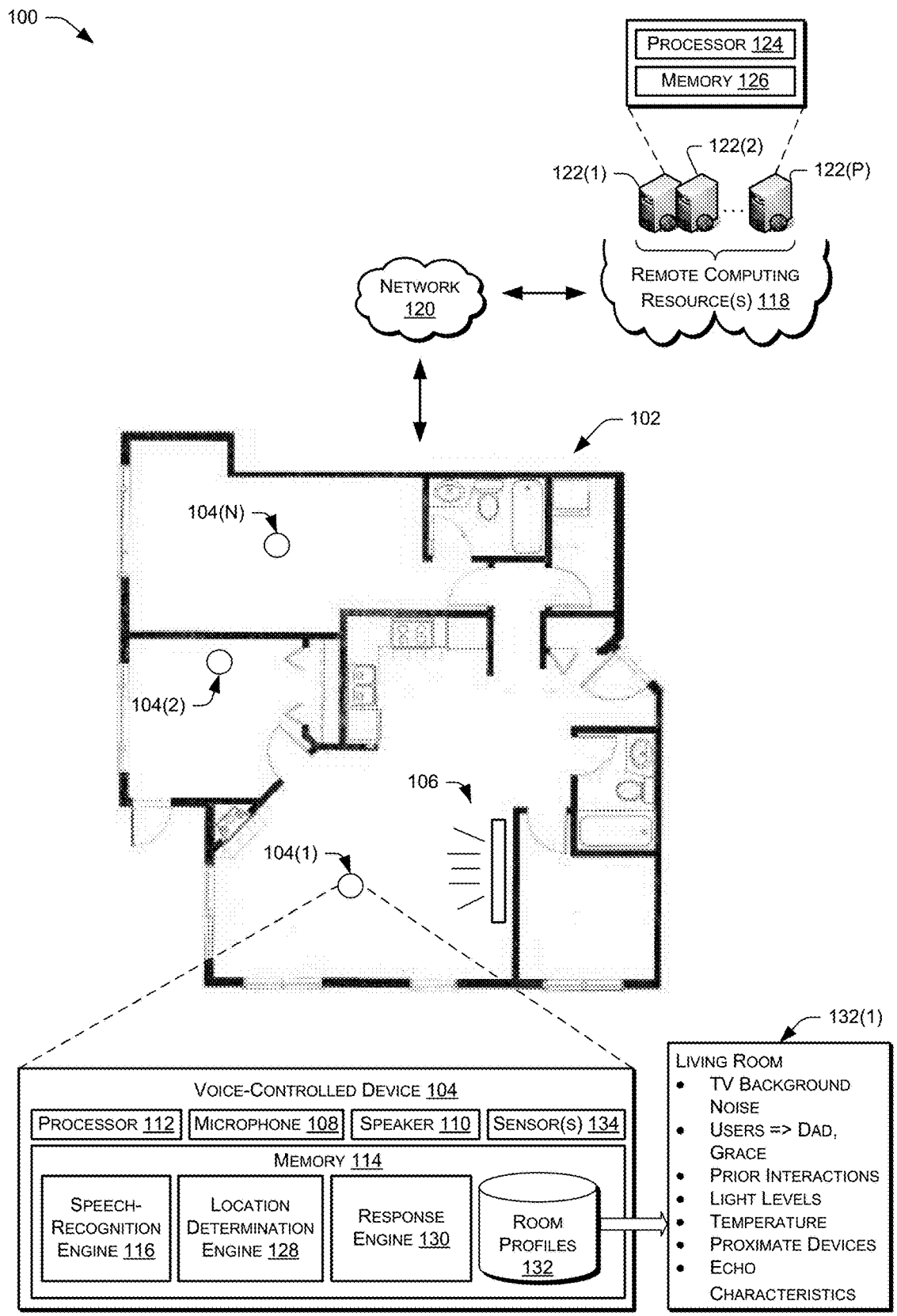
FIG. 1 shows an illustrative voice interaction computing architecture set in an environment that includes multiple rooms. As illustrated, several of the rooms include a respective voice-controlled device configured to receive voice commands from a user. As described below, each device may attempt to determine its respective location within the environment for the purpose of determining operations to perform in response to receiving voice commands, how to perform operations requested in the voice commands and/or how to interact with the users.

This disclosure describes, in part, techniques for identifying a location of a voice-controlled device within an environment. After identifying a location of the device, the device may receive a voice command from a user within the environment and may determine a response to the command based in part on the location, may determine how to output a response based in part on the location or may determine how to interact with the user based in part on the location.

As described below, the location of a device may be determined in based on implicit and/or explicit data captured from an environment in which the device resides. For instance, the voice-controlled device may determine its location based on sound captured by the device. In one example, a microphone of the device may capture sound and generate an audio signal based on the sound. The device may then analyze the audio signal for identifying background noise proximate to the device. For instance, if the device determines that the background noise includes a television or stereo, the device may determine that it resides within a living or entertainment room. If, however, the device determines that the background noise includes sounds associated with cooking (e.g., a sizzle of a frying pan, a mixer, etc.), then the device may determine that it resides within a kitchen.

In another example, the device may include one or more sensors in addition to the microphone for the purpose of determining its location. For instance, the device may include a light sensor, a temperature sensor, a camera or the like. The device may then gather data via the sensors and determine its location based on this data. For instance, the device may determine an amount or direction or color temperature of light in the room and/or a temperature of the room and may compare this data to known characteristics of rooms within the environment. In addition or in the alternative, the device may capture images (e.g., static images or video) of the room in which the device resides and may determine its location based on analyzing these images.

In still another example, the device may analyze previous interactions between the device and users within the environment when determining its location. For instance, the device may determine a father of the house most often issues commands to the device and the device may accordingly determine that the location is likely an office of the father. Or, the device may determine that a daughter in the family often communicates with the device and often requests recipe information and, based in part on this information, the device may determine that it is located in the kitchen. In still other examples, the device may simply query the user as to its location and receive a response (e.g., audibly) indicating which the room in which the device resides.

After identifying its location, the device may alter its responses to received voice commands based at least in part on the location. For instance, if a device determines that it is located in an entertainment room, then the device may be more likely to issue video search results in response to receiving a query at the device. If, however, the device determines that it is located in the kitchen, then the device may be more likely to issue search results that are cooking-focused.

In another example, the device may determine how to output a response to a voice command based on the device's location. For instance, if a user requests that the device play a particular song, then the device may play the song on its own speakers if no other speakers reside within the room of the device. If, however, a home theater system is located within a room that includes a home theater system, then the device may utilize the home theater system to play the song. In the latter instances, the device may couple (e.g., wirelessly) with the home theater system and may be configured to issue commands and, hence, control the output of the home theater system.

In still another example, the device may determine how to interact with a user based in part on the location of the device. For instance, the device may engage a user in a longer or different question-and-answer dialog in one room as compared to another room. Of course, while a few examples have been provided, the device may perform or alter any action at least partly based on its determined location within an environment. Furthermore, the devices and techniques described above may be implemented in a variety of different architectures and contexts. One non-limiting and illustrative implementation is described below.

Illustrative Environment

FIG. 1 shows an illustrative voice interaction computing architecture 100 set in an environment 102 that includes multiple rooms. The architecture 100 also includes a respective electronic voice-controlled device 104(1), 104(2), . . . , 104(N) (referred to as "voice-controlled device 104") located in several of the rooms. Users within the environment may interact (e.g., via voice commands) with the devices 104(1)-(N) in the environment. Each voice-controlled device 104 may be positioned on a table, a ceiling, a wall, in a lamp, beneath a table, under a chair or the like. Further, more than one device 104 may be positioned in a single room, or one device may be used to accommodate user interactions from more than one room.

As described in further detail below, each device 104 may use implicit and/or explicit data for the purpose of determining its respective location within the environment 102 (e.g., a room in which it resides). For instance, FIG. 1 illustrates that a room in which the device 104(1) resides includes a television 106 that emits audio associated with a television show or movie. The device 104(1) may capture this sound, determine that the device 104(1) resides in a room that includes a television and use this information for helping determine which room of the multiple rooms the device 104(1) resides in.

Generally, a voice-controlled device 104 has a microphone unit comprising at least one microphone 108. The device 104 also includes at least one speaker 110 to facilitate audio interactions with users within the environment, or may provide audio for output on speaker(s) of another device. In some instances, the voice-controlled device 104 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 104 may be through voice input and audible output. One example implementation of the voice-controlled device 104 is provided below in more detail with reference to FIG. 2.

The microphone 108 of the voice-controlled device 104 detects audio from the environment 102, such as sounds uttered from a user. As illustrated, the voice-controlled device 104 includes a processor 112 and memory 114, which stores or otherwise has access to a speech-recognition engine 116. As used herein, a processor may include multiple processors and/or one or more processors having multiple cores. The speech-recognition engine 116 performs speech recognition on audio captured by the microphone, such as utterances spoken by the user. The voice-controlled device 104 may perform certain actions in response to recognizing different speech from the user. The user may speak predefined commands (e.g., "Awake"; "Sleep"), or may use a more casual conversation style when interacting with the device 104 (e.g., "I'd like to go to a movie. Please tell me what's playing at the local cinema.").

In some instances, the voice-controlled device 104 may operate in conjunction with or may otherwise utilize computing resources 118 that are remote from the environment 102. For instance, the voice-controlled device 104 may couple to the remote computing resources 118 over a network 120. As illustrated, the remote computing resources 118 may be implemented as one or more servers 122(1), 122(2), . . . , 122(P) and may, in some instances form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing devices 118 include "on-demand computing", "software as a service (SaaS)", "platform computing", "network-accessible platform", "cloud services", "data centers", and so forth.

The servers 122(1)-(P) include a processor 124 and memory 126, which may store or otherwise have access to some or all of the components described with reference to the memory 114 of the voice-controlled device 104. For instance, the memory 126 may have access to and utilize the speech-recognition engine 116 for receiving audio signals from the device 104, recognizing speech and, potentially, causing performance of an action in response. In some examples, the voice-controlled device 104 may upload audio data to the remote computing resources 118 for processing, given that the remote computing resources 118 may have a computational capacity that far exceeds the computational capacity of the voice-controlled device 104. Therefore, the voice-controlled device 104 may utilize the speech-recognition engine 116 at the remote computing resources 118 for performing relatively complex analysis on audio captured from the environment 102.

Regardless of whether the speech recognition occurs locally or remotely from the environment 102, the voice-controlled device 104 may receive vocal input from a user and the device 104 and/or the resources 118 may perform speech recognition to interpret a user's operational request or command. The requests may be for essentially any type of operation, such as database inquiries, requesting and consuming entertainment (e.g., gaming, finding and playing music, movies or other content, etc.), personal information management (e.g., calendaring, note taking, etc.), online shopping, financial transactions, and so forth.

The voice-controlled device 104 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 114 of the voice-controlled device 104 also stores or otherwise has access to a location determination engine 128, a response engine 130, and one or more room profiles 132. The location determination engine 128 functions to determine a physical location of a respective voice-controlled device 104 within the environment 102. For instance, the engine 128 may determine a particular room in which the device 104 resides, a location within a room in which the device 104 resides, a floor of a building in which a device resides, a building in which a device resides, or any other type of location.

The location determination engine 128 may determine a location of the device 104 based on any combination of implicit and/or explicit data. For instance, a user may explicitly specify to the device (e.g., audibly, via a display, etc.) a location at which the device 104 resides. Additionally or alternatively, the engine 128 may capture data from the environment proximate to the device 104 and may compare this data to one or more of the room profiles 132. Based on this comparison (and/or based on explicit data), the device 104 may then determine its location within the environment. An example room profile 132(1), for instance, shows that a living room within the environment includes background noise from a television, that the users "Dad" and "Grace" are often present within the environment and may often communicate with this particular device, that the living room has a particular light level (or light-level range), that the living room has a particular temperature (or temperature range), that certain devices are located within the living room and, hence, are proximate to this particular device, that the living room has a particular set of echo characteristics and/or the like.

The room profiles 132 may be based on one or both of information that has been captured by the device 104 within the environment or information about rooms or locations generally. For instance, one room profile may include an indication that the living room within the particular environment 102 includes the television 106, with the voice-controlled device 104 having learned that information from capturing sound within the environment. A room profile for a kitchen, meanwhile, could include an indication that a device within the kitchen will frequently identify certain cooking sounds (represented by a certain frequency, amplitude, etc.). As such, the device 104 can both be pre-configured with the room profiles 132 and/or may build or customize the room profiles for a particular environment 102.

In one example, the engine 128 may receive audio signals from the microphone 108 and may determine a location of the device 104 based at least in part in on the analysis of the audio signals. For instance, the engine 128 may identify background noise from the audio signals. The background noise may represent sound from a television 106, sound from a stereo system, users talking, cooking sounds, typing sounds, wind or other weather-related sounds or the like. In some instances, the engine 128 may compare characteristics of the audio signals, such as frequency, volume, waveform, etc., to known audio signals to identify these noises. That is, the engine 128 may compare an audio signal to a datastore of labeled audio signals to identify the sound (e.g., a cooking sound, the wind, etc.).

In addition, the engine 128 may analyze the audio signals to identify (e.g., via voice-recognition techniques) which users are proximate to the device. The engine 128 may also analyze the audio signal to identify echo characteristics of the room in which the device resides. In another example, the speaker 110 of the device 104 may output audio, which may be captured by the microphone 108 of the device 104. The engine 128 may then analyze an audio signal generated by the microphone 108 to determine the echo characteristics of the room (e.g., an amount of reflected sound indicated in a generated audio signal).

Furthermore, in some instances the device 104 may include one or more additional sensors, such as a light sensor, a temperature sensor, a camera and/or the like. The location determination engine 128 may receive data captured by the sensors and may determine a location of the device 104 based at least in part on this data. For instance, the engine 128 may receive an indication of an amount or color temperature of light within the room from the light sensor, may receive a temperature from the temperature range and/or may receive one or more images of the room from the camera. The engine 128 may then compare this information to one or more room profiles 132 to determine the room in which the device 104 resides.

In still other instances, the device 104 may include one or more wireless interfaces (discussed below with reference to FIG. 2). The wireless interface of the device may operate to identify one or more other devices having wireless capabilities proximate to the device 104. For instance, the device 104 may identify (e.g., via Bluetooth, WiFi, etc.) other devices that are near the device 104, such as appliances, electronic devices, etc. If the device 104 determines that kitchen appliances (e.g., having Bluetooth capabilities) are proximate to the device, then the device 104 may determine that it is likely located in the kitchen. If, however, the device 104 determines that a home theater system is proximate to the device, then the device 104 may determine that it is likely located in the living room or an entertainment room.

After receiving and analyzing data from the microphone 108 and the one or more other sensors 134, the engine 128 may compare this data to one or more room profiles 132. The engine 128 may then determine a best match between the analyzed data and the room profiles to determine the likely location of the device 104.

After receiving an indication of a designated location of the device 104, the response engine 130 may determine content to output in response to receiving a voice command, with the content being based at least in part on the designated location of the device. For instance, if the user provides a voice command to "search for fried green tomatoes", then the device 104 may determine content to output to the user based in part on the location of the device 104. For instance, if the device is located in the kitchen, the device 104 may output (e.g., audibly, visually, etc.) instructions for how to cook fried green tomatoes. If, however, the device 104 is located in an entertainment room, then the device 104 may return search results associated with the movie "Fried Green Tomatoes".

In addition or in the alternative, the response engine 130 may determine how to output content based in part on the designated location of the device. For instance, if the user requests to play a certain song, then the response engine 130 may determine which set of speakers to utilize based on this location. If the device resides in a room without speakers that the device 104 controls, then the device 104 outputs the song via the speaker 110. If, however, the device resides in a room that includes a home theater system that is controllable by the device, then the device 104 may request that the home theater system output the song.

In still another example, the device 104 may determine how to interact with a user making a request based in part on the location of the device 104. For instance, if the user searches for "fried green tomatoes" in the entertainment room, the device 104 may return search results immediately. If, however, the user requests this information from a home office, the device 104 may query the user as to whether the user desires search results regarding how to cook fried green tomatoes or search results associated with the movie "Fried Green Tomatoes".

Illustrative Voice-Controlled Device

Figure 2:
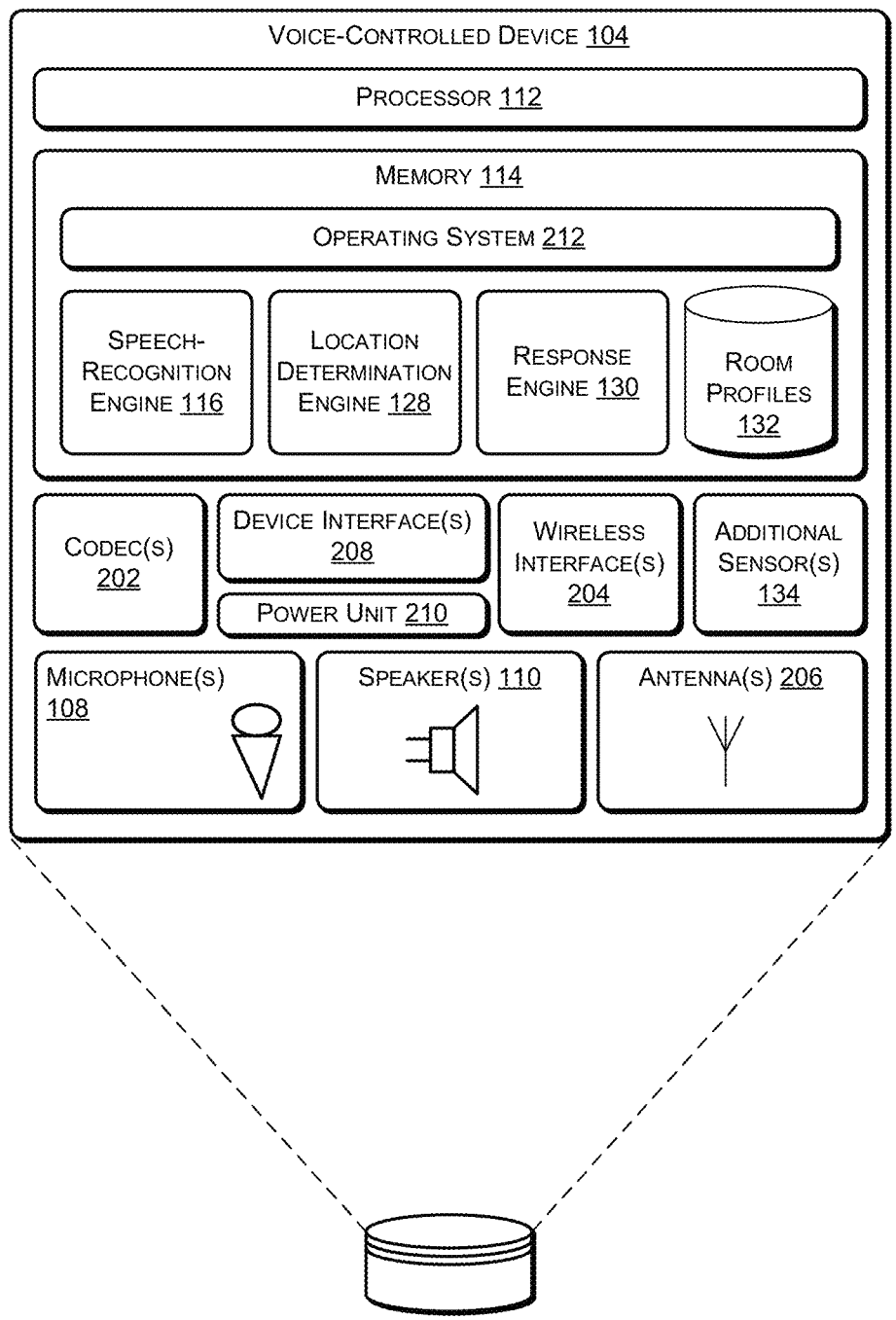
FIG. 2 shows a block diagram of selected functional components implemented in the voice-controlled device of FIG. 1.

FIG. 2 shows selected functional components of the voice-controlled device 104 in more detail. Generally, the voice-controlled device 104 may be implemented as a standalone device that is relatively simple in terms of functional capabilities with limited input/output components, memory and processing capabilities. For instance, the voice-controlled device 104 does not have a keyboard, keypad, or other form of mechanical input in some implementations, nor does it have a display or touch screen to facilitate visual presentation and user touch input. Instead, the device 104 may be implemented with the ability to receive and output audio, a network interface (wireless or wire-based), power, and limited processing/memory capabilities.

In the illustrated implementation, the voice-controlled device 104 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 104 includes a microphone unit that includes one or more microphones 108 to receive audio input, such as user voice input, and one or more speakers 110 to output audio sounds. Audio signals generated by the microphone unit may be generated by a single microphone or an array of microphones. In some instances, the audio signals may also be combined, processed, filtered and/or the like prior to being analyzed in the manners described above and below.

One or more codecs 202 are coupled to the microphone 108 and speaker 110 to encode and/or decode the audio signals. The codec may convert audio data between analog and digital formats. A user may interact with the device 104 by speaking to it, and the microphone 108 captures the user speech. The codec 202 encodes the user speech and transfers that audio data to other components. The device 104 can communicate back to the user by emitting audible statements through the speaker 110 and, potentially, illuminating one or lights (e.g., LEDs) of the device 104 while outputting sound through the speaker 110. In this manner, the user interacts with the voice-controlled device simply through speech, without use of a keyboard or display common to other types of devices.

In the illustrated example, the voice-controlled device 104 includes one or more wireless interfaces 204 coupled to one or more antennas 206 to facilitate a wireless connection to a network. The wireless interface 204 may implement one or more of various wireless technologies, such as wifi, Bluetooth, RF, and so on.

One or more device interfaces 208 may further be provided as part of the device 104 to facilitate a wired connection to a network, or a plug-in network device that communicates with other wireless networks. The interfaces 208 may include USB or other forms of wired connections, such as a broadband connection. A power unit 210 is further provided to distribute power to the various components on the device 104.

The voice-controlled device 104 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 104 may include non-input control mechanisms, such as basic volume control button(s) for increasing/decreasing volume, as well as power, reset and mute buttons. There may also be a simple light element (e.g., LED) to indicate a state such as, for example, when power is on. But, otherwise, the device 104 does not use or need to use any input devices or displays in some instances.

Several modules such as instruction, datastores, and so forth may be stored within the memory 114 and configured to execute on the processor 112. An operating system module 212 is configured to manage hardware and services (e.g., wireless unit, USB, Codec) within and coupled to the device 104 for the benefit of other modules.

In addition, the memory 114 may include the speech-recognition engine 116, the location determination engine 128, the response engine 130 and the room profiles 132, discussed above. Also as discussed above, some or all of these engines, data stores, and components may reside additionally or alternatively at the remote computing resources 118.

Illustrative Processes

Figure 3:
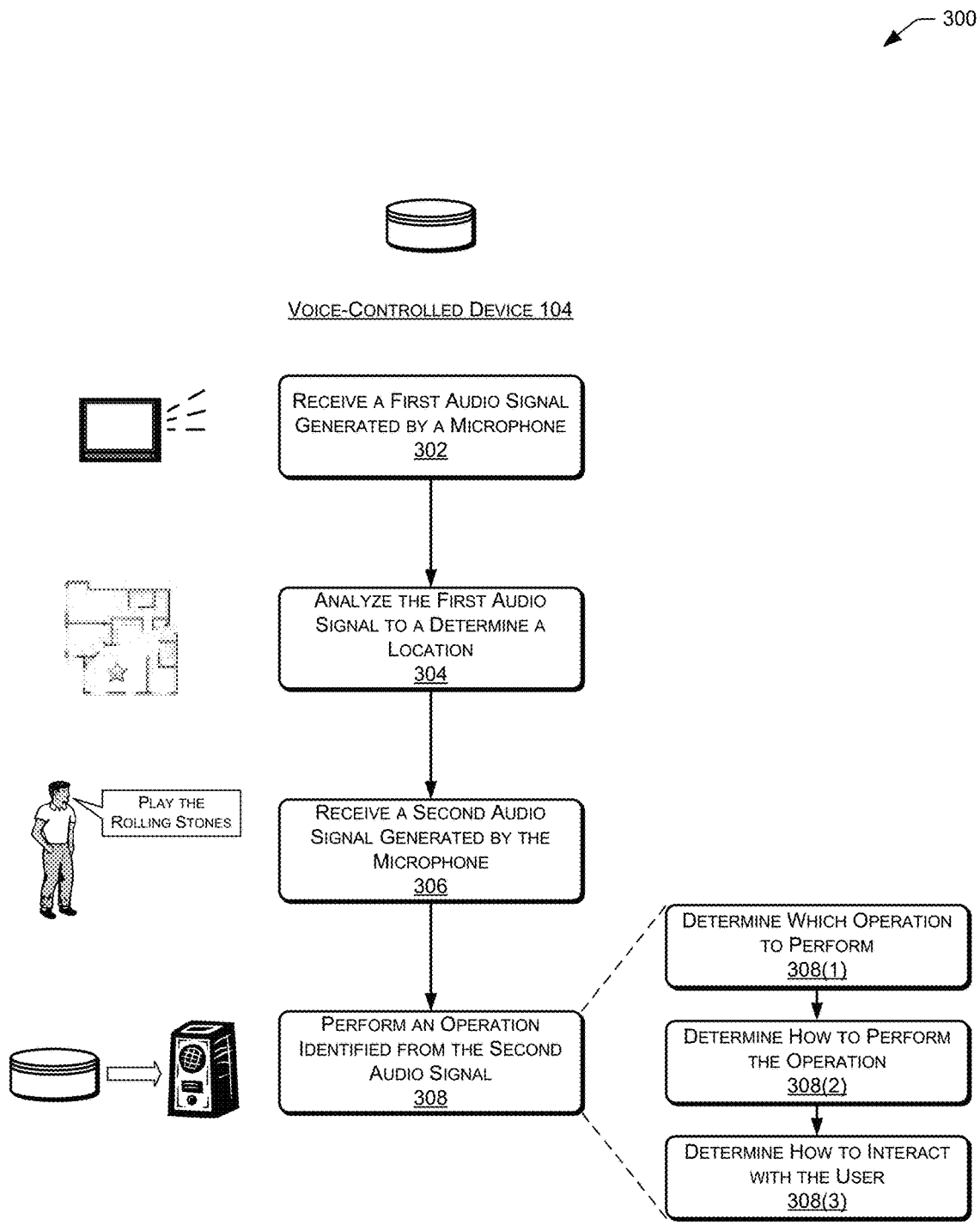
FIG. 3 depicts a flow diagram of an example process of a voice-controlled device analyzing a first audio signal to determine the device's location and performing an operation based on a subsequently received voice command from a user based on the location of the device.

FIG. 3 depicts a flow diagram of an example process 300 of the voice-controlled device 104 analyzing a first audio signal to determine the device's location and performing an operation based on a subsequently received voice command from a user based on the location of the device. While this figure describes the device 104 performing this process, in other instances one or more other entities may additionally or alternatively perform one or more of these actions.

The process 300 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the device 104 receives a first audio signal generated by a microphone of the device 104, with the signal being based on a sound captured by the microphone. At 304, the device 104 may then analyze the first audio signal to identify a location of the device. For instance, the device 104 may identify background noise from a television in the audio signal and may identify a room in which the device resides based on this information. That is, the device may map the identified background noise to the identified room based on a profile of the room or similarly situated rooms (e.g., living rooms of other users, etc.). The device 104 may additionally determine this location using data captured by one or more other sensors.

At 306, the device receives a second audio signal generated by the microphone. The second audio signal may be discrete from the first audio signal or may form a different portion of a same audio signal as the first audio signal. In either instance, the device may generate the first audio signal close in time or a large amount of prior to generating the second audio signal. In this example, the second audio signal includes a voice command from a user to "Play the Rolling Stones".

At 308, the device 104 performs speech recognition on the second audio signal to identify the command and identifies and performs an operation based on the voice command and based at least in part on the identified location. This operation may include one or more of sub-operations 308(1), 308(2), and 308(3). At 308(1), the device determines which operation of multiple operations to perform based at least in part on the location of the device. At 308(2), the device 104 determines how to perform the operation based at least in part on the location. At 308(3), the device determines how to interact with the user based at least in part on the location of the device. In the illustrated example, the device 104(1) determines to output a song by the Rolling Stones on a home stereo system that is determined to be in the same room as the device 104.

Figure 4:
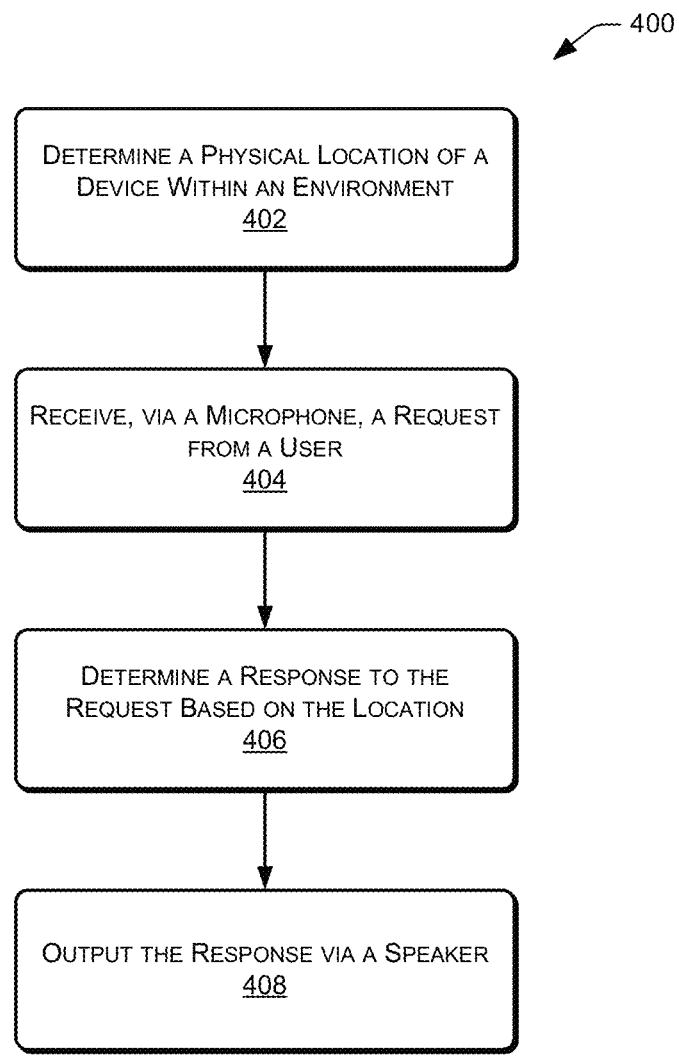
FIG. 4 depicts a flow diagram of an example process for determining a physical location of a device within an environment, receiving a request from a user, determining a response to the request based in part on the location of the device and outputting the response via a speaker.

FIG. 4 depicts a flow diagram of another example process 400. At 402, the process 400 determines a physical location of a device within an environment. This may be based on implicit data, explicit data or a combination thereof. At 404, the process 400 receives, via a microphone, a request from a user within the environment. At 406, the process 400 determines a response to provide to the request based at least in part on the request and on the location of the device. At 408, the process 400 outputs the response via a speaker.

Figure 5:
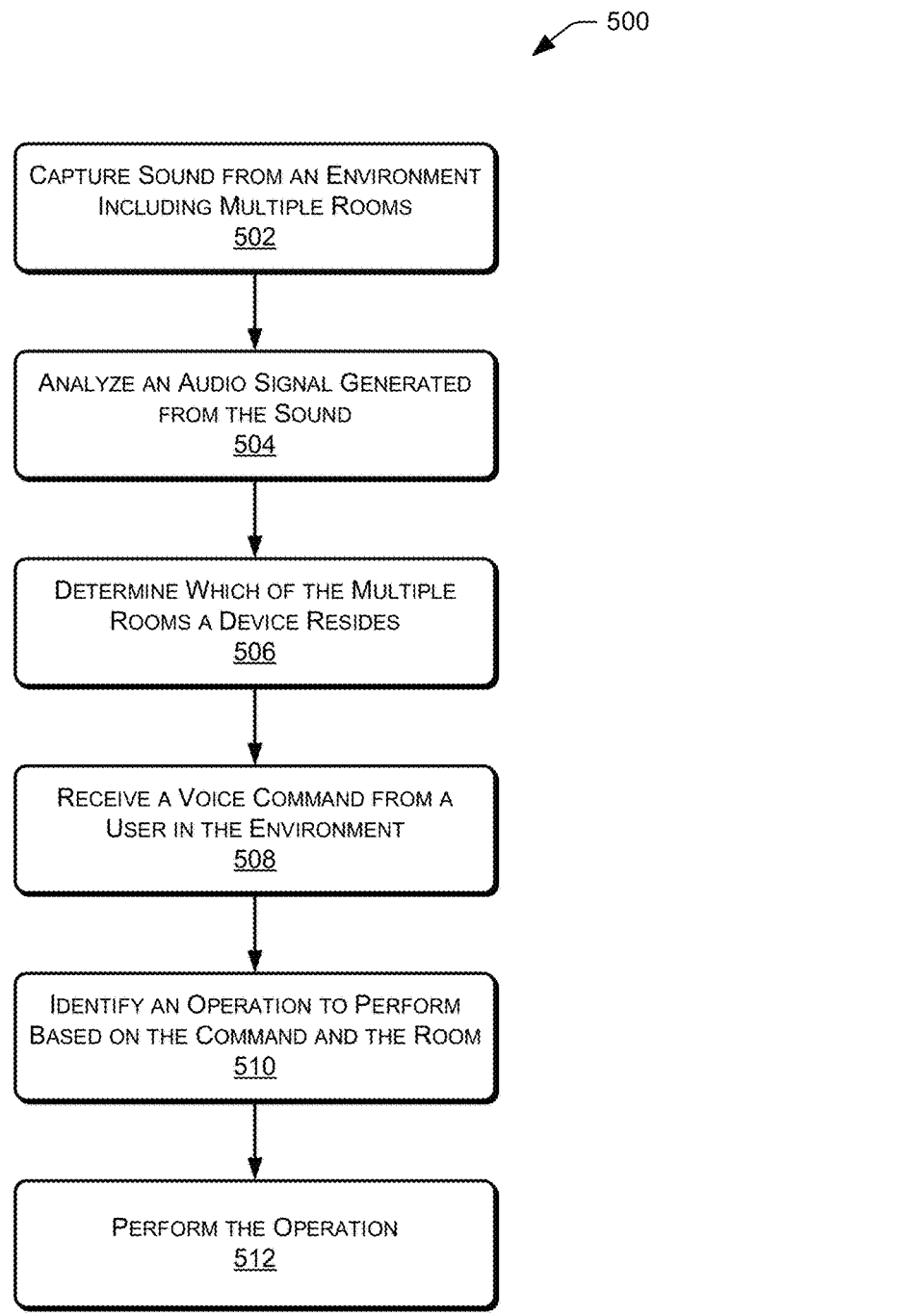
FIG. 5 depicts a flow diagram of an example process for determining which room of multiple rooms in a device resides in, receiving a voice command from a user and performing an operation based on the voice command and the room in which the device resides.

FIG. 5 depicts a flow diagram of an example process 500. At 502, the process 500 captures, at a device, sound from an environment that includes multiple rooms. At 504, the process 500 analyzes an audio signal generated from the sound. At 506, the process 500 determines which room of multiple rooms the device resides in. At 508, the process 500 receives a voice command from a user within the environment. At 510, the process 500 identifies an operation to perform based on the voice command and based on the determined location of the device. Finally, at 512, the process 500 performs the operation.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more non-transitory computer-readable media storing one or more computer-executable instructions that, when executed by the one or more processors, cause the one or more processors to perform operations comprising:
receiving sensor data generated by one or more sensors of a first electronic device residing in an environment;
analyzing the sensor data to determine a location of the first electronic device in the environment;
storing location data indicating the location of the first electronic device in the environment;
receiving, from the first electronic device, request data representing a request to perform an operation;
causing the first electronic device or a second electronic device in the environment to perform the operation based at least in part on the request and the location data.

2. The system as recited in claim 1, wherein the sensor data comprises first sensor data, the location comprises a first location, the location data comprises first location data, and the operations further comprise:
receiving second sensor data generated by the one or more sensors of the first electronic device;
analyzing the second sensor data to determine a second location of the first electronic device in the environment; and
storing second location data indicating the second location of the first electronic device in the environment.

3. The system as recited in claim 2, wherein the request data comprises first request data, the request comprises a first request, the operation comprises a first operation, and the operations further comprise:
receiving, from the first electronic device, second request data representing a second request to perform a second operation;
causing the first electronic device or the second electronic device to perform the second operation based at least in part on the second request and the second location data.

4. The system as recited in claim 1, wherein the one or more sensors comprise a camera, the sensor data comprises image data generated by the camera, and the analyzing comprises analyzing the image data to determine the location of the first electronic device in the environment.

5. The system as recited in claim 1, wherein the one or more sensors comprise a microphone, the sensor data comprises audio data generated by the microphone, and the analyzing comprises analyzing the audio data to determine the location of the first electronic device in the environment.

6. The system as recited in claim 1, wherein:
the one or more sensors comprise a microphone;
the sensor data comprises audio data generated by the microphone; and
the analyzing comprises analyzing the audio data to determine an echo characteristic of the environment, the determining of the location based at least in part on the echo characteristic.

7. The system as recited in claim 1, wherein:
the one or more sensors comprise a microphone;

the sensor data comprises audio data generated by the microphone; and the analyzing comprises analyzing the audio data to determine background noise of the environment, the determining of the location based at least in part on the background noise.

8. The system as recited in claim 1, the operations further comprising determining, based at least in part on at least one of the sensor data, an identity of a user associated with the request, and wherein causing the first electronic device or the second electronic device to perform the operation is further based at least in part on the identity of the user.

9. A method comprising:

receiving sensor data generated by one or more sensors of a first electronic device residing in an environment;

analyzing the sensor data to determine a location of the first electronic device in the environment;

storing location data indicating the location of the first electronic device in the environment;

receiving, from the first electronic device, request data representing a request to perform an operation;

causing the first electronic device or a second electronic device in the environment to perform the operation based at least in part on the request and the location data.

10. The method as recited in claim 9, wherein the sensor data comprises first sensor data, the location comprises a first location, the location data comprises first location data, and the method further comprises:

receiving second sensor data generated by the one or more sensors of the first electronic device;

analyzing the second sensor data to determine a second location of the first electronic device in the environment; and storing second location data indicating the second location of the first electronic device in the environment.

11. The method as recited in claim 10, wherein the request data comprises first request data, the request comprises a first request, the operation comprises a first operation, and the method further comprises:

receiving, from the first electronic device, second request data representing a second request to perform a second operation;

causing the first electronic device or the second electronic device to perform the second operation based at least in part on the second request and the second location data.

12. The method as recited in claim 9, wherein the one or more sensors comprise a camera, the sensor data comprises image data generated by the camera, and the analyzing comprises analyzing the image data to determine the location of the first electronic device in the environment.

13. The method as recited in claim 9, wherein the one or more sensors comprise a microphone, the sensor data comprises audio data generated by the microphone, and the analyzing comprises analyzing the audio data to determine the location of the first electronic device in the environment.

14. The method as recited in claim 9, wherein:

the one or more sensors comprise a microphone;

the sensor data comprises audio data generated by the microphone; and the analyzing comprises analyzing the audio data to determine an echo characteristic of the environment, the determining of the location based at least in part on the echo characteristic.

15. The method as recited in claim 9, wherein:

the one or more sensors comprise a microphone;

the sensor data comprises audio data generated by the microphone; and the analyzing comprises analyzing the audio data to determine background noise of the environment, the determining of the location based at least in part on the background noise.

16. The method as recited in claim 9, further comprising determining, based at least in part on at least one of the sensor data, an identity of a user associated with the request, and wherein causing the first electronic device or the second electronic device to perform the operation is further based at least in part on the identity of the user.

17. One or more non-transitory computer-readable media storing one or more computer-executable instructions that, when executed by one or more processors, cause the one or more processors to perform operations comprising:

receiving sensor data generated by one or more sensors of a first electronic device residing in an environment;

analyzing the sensor data to determine a location of the first electronic device in the environment;

storing location data indicating the location of the first electronic device in the environment;

receiving, from the first electronic device, request data representing a request to perform an operation;

causing the first electronic device or a second electronic device in the environment to perform the operation based at least in part on the request and the location data.

18. The one or more computer-readable media as recited in claim 17, wherein the sensor data comprises first sensor data, the location comprises a first location, the location data comprises first location data, and the operations further comprise:

receiving second sensor data generated by the one or more sensors of the first electronic device;

analyzing the second sensor data to determine a second location of the first electronic device in the environment; and storing second location data indicating the second location of the first electronic device in the environment.

19. The one or more computer-readable media as recited in claim 18, wherein the request data comprises first request data, the request comprises a first request, the operation comprises a first operation, and the operations further comprise:

receiving, from the first electronic device, second request data representing a second request to perform a second operation;

causing the first electronic device or the second electronic device to perform the second operation based at least in part on the second request and the second location data.

20. The one or more computer-readable media as recited in claim 17, wherein the one or more sensors comprise a camera, the sensor data comprises image data generated by the camera, and the analyzing comprises analyzing the image data to determine the location of the first electronic device in the environment.

\* \* \* \* \*